No. 638,188.  
U. P. SMITH.  
MEANS FOR CONNECTING ENDS OF PNEUMATIC TUBES.  
(Application filed Apr. 17, 1899.)  
(No Model.)

Patented Nov. 28, 1899.

Witnesses.  
Robert Everett

Inventor.  
Uzziel P. Smith,  
By James L. Norris  
Att'y.

UNITED STATES PATENT OFFICE.

UZZIEL P. SMITH, OF CHICAGO, ILLINOIS.

MEANS FOR CONNECTING ENDS OF PNEUMATIC TUBES.

SPECIFICATION forming part of Letters Patent No. 638,188, dated November 28, 1899.

Application filed April 17, 1899. Serial No. 713,313. (No model.)

*To all whom it may concern:*

Be it known that I, UZZIEL P. SMITH, a citizen of the United States, residing at Chicago, in the county of Cook and State of Illinois, have invented new and useful Improvements in Means for Detachably Connecting the Ends of the Inner Tubes of Pneumatic Tires, of which the following is a specification.

My invention relates to an improvement in means for detachably connecting the ends of the inner tubes of pneumatic tires.

It is the object of my invention to provide improved means for connecting the ends of an air-tube without the use of cement, whereby said tube may be readily formed into an annulus through which the air may circulate uninterruptedly.

Other objects of the invention relate to details of construction and operation of the parts, all of which will more clearly hereinafter appear.

I have illustrated my invention in the accompanying drawings, in which—

Figure 1:
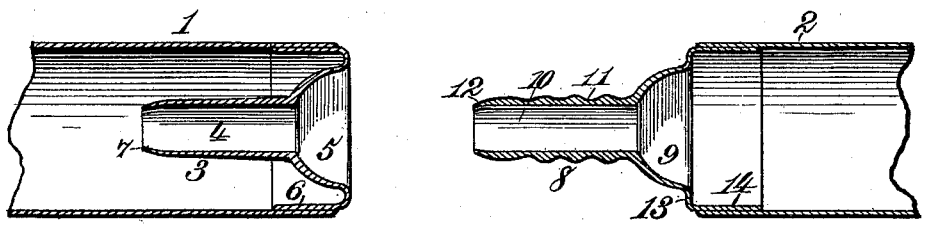
Figure 2:
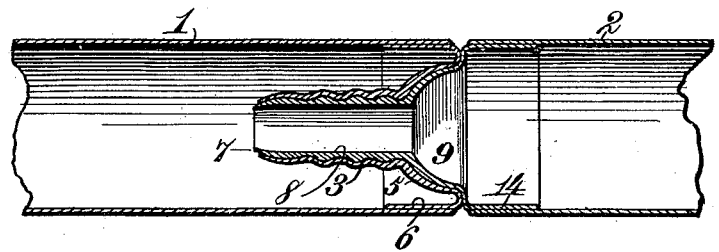

Figure 1 is a sectional view showing opposite ends of a tube provided with my improvement, said ends being disconnected; and Fig. 2 is a similar view showing the ends connected.

Referring to the drawings, the reference-numeral 1 indicates one end of an ordinary inner or air tube of a pneumatic tire, and 2 indicates the opposite end. Secured in the end 1 is the female member 3 of the fastener, which is of rubber and comprises a tubular portion 4, extending backward within the tube 1, as shown. Formed integral with this tube at its outer end is a hollow semispherical or cup-shaped portion 5, the concave of which opens outward. The outer edge of this cup-shaped portion 5 is continued in the form of a thin rubber tube 6, which is bent backward upon itself and cemented or otherwise secured in the end of tube 1, as shown. The portion 5 is considerably thicker than the tube 6, and the tubular portion 4 is gradually reduced in thickness to its inner end 7, which is slightly contracted or reduced in diameter, as shown.

The male member 8 of the fastener is of rubber, but is considerably thicker and harder than the member 3. This member of the fastener comprises a cup-shaped portion 9, extending outward from which is a tube or nipple 10, corrugated on its outer surface, as shown at 11, and having a smooth rounded end 12. The inner end of the portion 9 has an integral annular shoulder 13, extending outward from which is an integral thin rubber tubular extension 14, which is cemented or otherwise secured in the end 2 of the tube. For connecting the two ends of the tube together to form the annulus the nipple 10 is inserted in the short tube 4, such insertion being facilitated by the smooth rounded end 12, the cup-shaped portion 9 fitting snugly within the concave of the cup-shaped portion 5 and the opposite ends of the tube being brought close together, this position of the parts being shown in Fig. 2. The engagement of the tube 4 with the corrugated portion of tube or nipple 10 will prevent the two parts being disengaged under ordinary conditions and the contracted portion or end 7 will fit closely over the rounded portion 12. When the parts are in engagement, it will be seen that the air can pass freely through the opening in nipple 10 and will exert pressure on the inside of said nipple, while the air in the end 1 will exert pressure on the outside of the short tube 4. Hence said short tube 4 and nipple 10 will be pressed together by pressure exerted from without and within and no air can escape between them. The part 8 is readily inserted in the part 3 and these parts may be easily disengaged by pulling them asunder.

It will be seen that an air-tube provided with my fastening means may be inserted in a tire of the Morgan & Wright type, for example, and then have its ends connected, or the ends of the tube may be first connected and the tube employed in connection with the ordinary clencher-tire. The parts form a firm air-tight connection and, as stated, may be readily connected or disconnected, no cement or other additional securing means being employed.

Having thus fully described my invention, what I claim as new is—

1. The combination of an air-tube having open ends, of means for detachably connecting said ends comprising a cup-shaped rubber body secured in one end of the air-tube and presenting an outer concaved side, a short tube formed integral with said cup-shaped portion and extending backward within the air-tube, a cup-shaped rubber body secured in the opposite end of the air-tube and presenting an outer convex side, and a tubular nipple formed integral with said last-named cup-shaped body and projecting outward therefrom, the two parts being designed and adapted to be brought into engagement, substantially as and for the purpose set forth.

2. The combination with an air-tube having open ends, of means for detachably connecting said ends comprising a cup-shaped rubber body secured in one end of the air-tube and presenting an outer concaved side, a short tube formed integral with said cup-shaped portion and extending backward within the air-tube and having a contracted inner end, a cup-shaped rubber body secured in the opposite end of the air-tube and presenting an outer convex side, and a tubular nipple formed integral with said last-named cup-shaped body and projecting outward therefrom and having an outer corrugated surface and a smooth rounded end, the two parts being designed and adapted to be brought into engagement, substantially as described.

3. The combination with an air-tube having open ends, of means for detachably connecting said ends comprising a cup-shaped rubber body presenting an outer concaved side and having its edge extended to form a thin rubber tubular portion which is bent backward upon itself and secured to the inner side of the wall of one end of the air-tube, a short tube formed integral with said cup-shaped portion and extending backward within the air-tube, a cup-shaped rubber body presenting an outer convex side and having a thin tubular extension secured to the inner side of the wall of the opposite end of the air-tube, and a tubular nipple formed integral with said last-named cup-shaped body and projecting outward therefrom, the two parts being designed and adapted to be brought into engagement, substantially as and for the purpose set forth.

In testimony whereof I have hereunto set my hand in presence of two subscribing witnesses.

UZZIEL P. SMITH.

Witnesses:
GEO. W. REA,
BRUCE S. ELLIOTT.